United States Patent
Yan et al.

(10) Patent No.: US 7,949,797 B2
(45) Date of Patent: May 24, 2011

(54) COMPUTER DOCKING STATION AND SWITCHING METHOD THEREOF

(75) Inventors: Xiaoping Yan, Beijing (CN); Wei Xie, Beijing (CN); Zihua Guo, Beijing (CN)

(73) Assignee: Lenovo (Beijing) Limited, Haidian District, Beijing (CN)

(*) Notice: Subject to any disclaimer, the term of this patent is extended or adjusted under 35 U.S.C. 154(b) by 131 days.

(21) Appl. No.: 12/561,630

(22) Filed: Sep. 17, 2009

(65) Prior Publication Data

US 2010/0077109 A1    Mar. 25, 2010

(30) Foreign Application Priority Data

Sep. 22, 2008  (CN) .......................... 2008 1 0222681

(51) Int. Cl.
*G06F 3/00* (2006.01)
(52) U.S. Cl. ................. 710/15; 710/16; 710/17; 710/38
(58) Field of Classification Search .................... 710/15, 710/16, 17, 38
See application file for complete search history.

(56) References Cited

U.S. PATENT DOCUMENTS

| | | | | |
|---|---|---|---|---|
| 6,137,802 | A * | 10/2000 | Jones et al. .................... | 370/401 |
| 2003/0065816 | A1* | 4/2003 | Dharmadhikari et al. .... | 709/240 |
| 2004/0148445 | A1* | 7/2004 | Lee et al. ......................... | 710/72 |
| 2005/0020319 | A1* | 1/2005 | Kim et al. ....................... | 455/566 |
| 2006/0143310 | A1* | 6/2006 | Fukushima .................... | 709/250 |
| 2006/0233191 | A1* | 10/2006 | Pirzada et al. ................. | 370/463 |
| 2007/0162634 | A1* | 7/2007 | Okazaki .......................... | 710/15 |
| 2008/0056285 | A1* | 3/2008 | Quinn et al. ................... | 370/401 |
| 2010/0280339 | A1* | 11/2010 | Russ .............................. | 600/301 |

* cited by examiner

*Primary Examiner* — Alford W Kindred
*Assistant Examiner* — David E Martinez
(74) *Attorney, Agent, or Firm* — Osha • Liang LLP (57) ABSTRACT

The present invention provides a computer docking station and a switching method thereof. The method comprises: monitoring whether a wired input/output module is connected to a host computer, and outputting a monitoring result; controlling a first data processing module to be connected to the wired input/output module when the monitoring result indicates that the wired input/output module is connected to the host computer, or otherwise controlling the first data processing module to be connected to a wireless input/output module when the monitoring result indicates that the wired input/output module is not connected to the host computer. According to the present invention, an extended interface can be provided to the host computer in either of a wireless way and a wired way.

12 Claims, 4 Drawing Sheets

Fig. 5

COMPUTER DOCKING STATION AND SWITCHING METHOD THEREOF

BACKGROUND OF THE INVENTION

1. Field of Invention

The present invention relates to peripheral devices in the computer field and the transmission control technology for computers, and in particular, to a computer docking station and a switching method thereof.

2. Description of Prior Art

Figure 1:
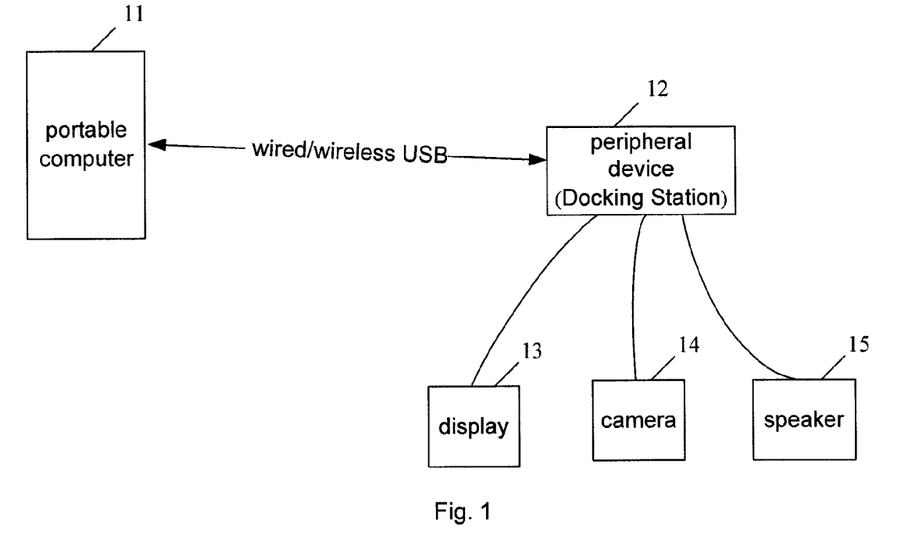
FIG. 1 is a schematic diagram showing a connection between a computer docking station and a host computer in the prior art.

Currently, a computer docking station has become a very important peripheral device of a computer system, in particular, a portable computer system. As shown in FIG. 1, a docking station 12 is connected to a portable computer 11 through a Universal Serial Bus (USB) cable, or through a Wireless USB (WUSB), or by means of other interface cables or wireless protocols (e.g. Ultra wideband general radio platform (WiNet) etc.), and thus may extend all Input/Output (I/O) ports of the computer, i.e. peripheral device interfaces such as serial port, parallel port, Ethernet port, video interface, microphone/speaker interface. FIG. 1 shows a display 13 connected through a video interface of the docking station 12, and a camera 14 and a speaker 15 connected through a camera interface and a speaker interface of the docking station 12 respectively.

As a new technology, existing docking stations mainly comprise several types as follows.

1) Docking Station with Wired USB Interface

Such kind of docking station is connected to a computer by means of a general USB interface. All Ethernet, VGA/DVI and audio signals extended from the computer must be packetized into USB data packets and then transmitted to the docking station, which in turn converts the USB data packets into data for different kinds of interfaces.

2) Docking Station with Wireless Interface Such as Ultra Wideband (UWB)

Such kind of docking station is connected to a computer through wireless UWB manner to implement the conversion of UWB data packets into data packets for different kinds of interfaces.

The inventor found the following disadvantages of the prior art in implementing the present invention. The first type of docking station described above has no wireless extension function, and thus lacks a flexible mobility; whereas, the second type of docking station only has a wireless extension function, and thus cannot be supported and used by a computer without the UWB capability. It can be seen that existing docking stations can not support both the wireless and wired connections, resulting in limited applications.

SUMMARY OF THE INVENTION

An object of the present invention is to provide a computer docking station and a switching method thereof, by which it is possible to provide an extended interface to a host computer including an embedded portable host computer device in either of a wireless way and a wired way.

In order to achieve the above object, according to an aspect of the present invention, there is provided a computer docking station, comprising:

a wireless input/output module adapted to receive data from a host computer in a wireless way and/or transmit data to the host computer in a wireless way;

a wired input/output module adapted to receive data from the host computer in a wired way and/or transmit data to the host computer in a wired way;

at least one extended interface unit adapted to be connected to at least one peripheral device;

a first data processing module which is connected to each of the at least one extended interface unit for processing data packets exchanged between the host computer and the peripheral device;

a monitoring module adapted to monitor whether the wired input/output module is connected to the host computer and/or monitor whether a wireless connection is established between the wireless input/output module and the host computer, and to output a monitoring result; and a first switching module adapted to control the first data processing module to be connected to the wired input/output module when the monitoring result indicates that the wired input/output module is connected to the host computer, and to control the first data processing module to be connected to the wireless input/output module when the monitoring result indicates that the wired input/output module is not connected to the host computer.

Preferably, in the above computer docking station, the first data processing module comprises:

a second switching module adapted to first process a data packet with a higher priority according to priority information of the data packet, wherein the priority information is predetermined based on a priority identification carried in the data packet or based on the service type of the data packet.

Preferably, in the above computer docking station, the first data processing module further comprises:

a decision module adapted to receive a data packet transmitted by the host computer, and to output a decision result indicating whether the data packet is a wireless data packet or a wired data packet according to a channel identification bit included in the data packet, wherein the channel identification bit is one added in the transmitted data packet by the host computer for identifying the data packet as a wireless data packet or a wired data packet.

Preferably, in the above computer docking station, the first data processing module further comprises: an alarm module adapted to receive the monitoring result and the decision result, and to output an indication signal indicating the first switching module is in normal operation when the monitoring result indicates that the wired input/output module is connected to the host computer and the decision result indicates a wired data packet or when the monitoring result indicates that the wired input/output module is not connected to the host computer and the decision result indicates a wireless data packet, or otherwise to output an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

Preferably, the computer docking station further comprises a second data processing module and a video transmission control module; the at least one extended interface unit includes a video interface unit which is connectable to a peripheral video device;

the wireless input/output module comprises a wireless interface, a first interface and a second interface, wherein the first interface is connected to the first data processing module, the second interface is connected to the second data processing module, and the wireless interface is adapted to receive wireless data packets from the host computer, then to transmit video data packets included in the wireless data packets to the second data processing module through the second interface, and to transmit other data packets included in the wireless data packets than the video data packets to the first data processing module through the first interface;

the second data processing module is connectable to the video interface unit, and is adapted to process the video data packets exchanged between the host computer and the video device; and the video transmission control module is adapted to receive the monitoring result, and to control the video interface unit to be connected to the first data processing module when the monitoring result indicates that the wired input/output module is connected to the host computer, or otherwise control the video interface unit to be connected to the second data processing module when the monitoring result indicates that wired input/output module is not connected to the host computer.

Preferably, in the above computer docking station, the video data packets are those generated by the host computer by performing transmission control process on data for the video service according to a video service data transfer protocol.

Preferably, in the above computer docking station, the video service data transfer protocol comprises Wimedia MAC based video service data transfer protocol customized by a user, IP protocol based Winet protocol, or next generation based Ultra wideband transfer protocol.

Preferably, in the above computer docking station, wherein, the wired input/output module comprises a USB interface module, and the monitoring module comprises a voltage divider circuit which is connected to a power pin of the USB interface module for outputting a high level signal when the USB interface module is connected to the host computer, and for outputting a low level signal when the USB interface module is not connected to the host computer, wherein the high level signal is provided to indicate that the wired input/output module is connected to the host computer, and the low level signal is provided to indicate that the wired input/output module is not connected to the host computer.

According to another aspect of the present invention, there is further provided a switching method of a computer docking station, comprising:

monitoring whether a wired input/output module of the computer docking station is connected to a host computer and/or monitoring whether a wireless connection is established between a wireless input module of the computer docking station and the host computer, and outputting a monitoring result, wherein the computer docking station is operable to receive data from the host computer in a wireless way and/or transmit data to the host computer in a wireless way through the wireless input/output module, and also is operable to receive data from the host computer in a wired way and/or transmit data to the host computer in a wired way through the wired input/output module;

controlling a first data processing module to be connected to the wired input/output module when the monitoring result indicates that the wired input/output module is connected to the host computer, or otherwise controlling the first data processing module to be connected to the wireless input/output module when the monitoring result indicates that the wired input/output module is not connected to the host computer, wherein the first data processing module is connected to at least one peripheral device through at least one extended interface unit for processing data packets exchanged between the host computer and the peripheral device.

Preferably, the above switching method further comprises: the first data processing module first processing a data packet with a higher priority according to priority information of the data packet, wherein the priority information is determined based on a priority identification carried in the data packet or is predetermined based on the service type of the data packet.

Preferably, the above switching method further comprises:

receiving a data packet transmitted by the host computer, and outputting a decision result which indicates whether the data packet is a wireless data packet or a wired data packet according to a channel identification bit included in the data packet, wherein the channel identification bit is one added in the transmitted data packet by the host computer for identifying the data packet as a wireless data packet or a wired data packet.

Preferably, the above switching method further comprises: receiving the monitoring result and the decision result, and outputting an indication signal indicating the first switching module is in normal operation when the monitoring result indicates that the wired input/output module is connected to the host computer and the decision result indicates a wired data packet or when the monitoring result indicates that the wired input/output module is not connected to the host computer and the decision result indicates a wireless data packet, or otherwise outputting an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

Preferably, the above switching method further comprises:

controlling a video interface unit to be connected to a second data processing module when the monitoring result indicates the wired input/output module is not connected to the host computer;

receiving wireless data packets from the host computer through a wireless interface, transmitting video data packets included in the wireless data packets to the second data processing module through a second interface, and transmitting other data packets included in the wireless data packets than the video data packets to the first data processing module through a first interface; and processing, by the second data processing module, the video data packets exchanged between the host computer and a video device.

Preferably, in the above switching method, the video data packets are those generated by the host computer by performing transmission control process on data for the video service according to a video service data transfer protocol.

Preferably, in the above switching method, the video service data transfer protocol comprises Wimedia MAC based video service data transfer protocol customized by a user, IP protocol based Winet protocol, or next generation based Ultra wideband transfer protocol.

Preferably, in the above switching method, the monitoring result is generated by: connecting a voltage divider circuit to a power pin of the wired input/output module, which voltage divider circuit outputs a high level signal when the wired input/output module is connected to the host computer, and outputs a low level signal when the wired input/output module is not connected to the host computer, wherein the high level signal is provided to indicate that the wired input/output module is connected to the host computer, and the low level signal is provided to indicate that the wired input/output module is not connected to the host computer.

It can be seen from the above that the computer docking station and the switching method thereof according to embodiments of the invention will achieve at least the following benefic effects.

1) According to the embodiments of the present invention, the monitoring module and the first switching module are incorporated into the computer docking station. As a result, it is possible to automatically switch between the wired input or the wireless input in operation, so as to provide a computer docking station switchable between the wired access and the wireless access, which has advantages such as convenience and flexibility in use.

2) In the embodiments of the present invention, it is possible to determine whether the first stage switching is normal by checking whether the data packet currently received matches the current operation channel. When the switching is abnormal, the user may get an alarm and know clearly where is the fault, so that he can employ corresponding measurements against the fault, resulting in improved reliability of the first stage switching.

3) According to some embodiments of the present invention, the transmission priority is set for the data packets, so that the reliability and high efficiency of transmission for the data packets whose priority is high are further ensured, and the flexibility of the channel selection based on practical needs is achieved.

4) According to the embodiments of the present invention, when there are both the USB wired data input and the UWB wireless data input, the default option is to support the USB wired data input. Thus, the channel selection is performed just at the first stage switching, and thereby it is possible to avoid the necessity that the subsequent data processes must support a plurality of USB controllers, and meanwhile it is possible to avoid the ping-pong effect due to unstable UWB data transmission, in which effect frequent switches between the USB and the UWB occur.

5) In the embodiments of the present invention, the addition of the dedicated video channel can compensate for the insufficient bandwidth due to the Wireless USB adopted by existing UWB, and at same time can adapt to the possibility that a new transmission interface may be adopted by the future UWB. Further, the docking station according to the embodiments of the present invention may be implemented by an embedded CPU, or alternatively may be implemented by a low cost FPGA or a dedicated ASIC.

DETAILED DESCRIPTION OF THE PREFERRED EMBODIMENTS

In a computer docking station and a switching method thereof according to embodiments of the present invention, a switching function is incorporated into the computer docking station to enable the docking station to provide an extended interface for a host computer (including embedded portable host devices) in either of a wireless way and a wired way. Hereinafter, the present invention will be described in detail with reference to the drawings as well as embodiments thereof.

Figure 2:
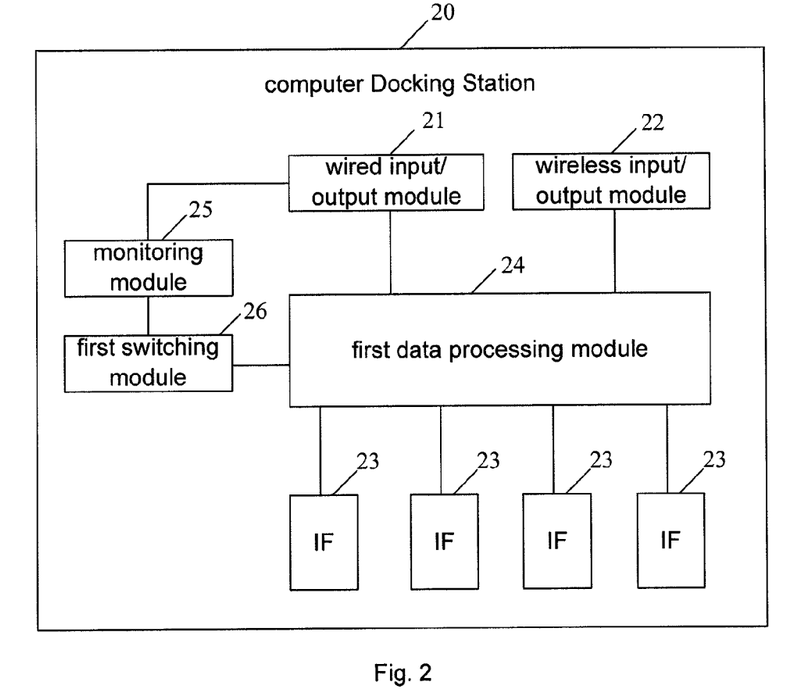
FIG. 2 is a schematic diagram showing a structure of a computer docking station according to an embodiment of the present invention.

As shown in FIG. 2, a computer docking station 20 according to an embodiment of the present invention comprises:

a wireless input/output module 22, through which the computer docking station 20 is connectable to a host computer, wherein the wireless input/output module may be a UWB wireless interface module;

a wired input/output module 21, through which the computer docking station 20 is connectable to the host computer, wherein the wired input/output module 21 may be a USB interface module;

one or more extended interface unit 23 to be connected to at least one peripheral device (e.g. a display, a speaker etc.) matching the extended interface unit 23;

a first data processing module 24 which is connected to each of the extended interface unit(s) 23, and is connectable to the wireless input/output module 22 or the wired input/output module 21, for processing data packets exchanged between the host computer and respective peripheral devices;

a monitoring module 25 for monitoring whether the wired input/output module 21 is connected to the host computer or not, and outputting a monitoring result, wherein the monitoring module 25 may also determine whether a wireless connection is established between the host computer and the wireless input/output module 22 by monitoring whether there are data being exchanged wirelessly between the host computer and the wireless input/output module 22, and then output a corresponding monitoring result; and a first switching module 26 for controlling the first data processing module 24 to be connected to the wired input/output module 21 when the monitoring result indicates that the wired input/output module 21 is connected to the host computer, and for controlling the first data processing module 24 to be connected to the wireless input/output module 22 when the monitoring result indicates that the wired input/output module 21 is not connected to the host computer, wherein the first switching module 26 may also control the first processing module to be connected to the wired input/output module when the monitoring result indicates that no wireless connection is established between the wireless input/output module and the host computer.

Figure 3:
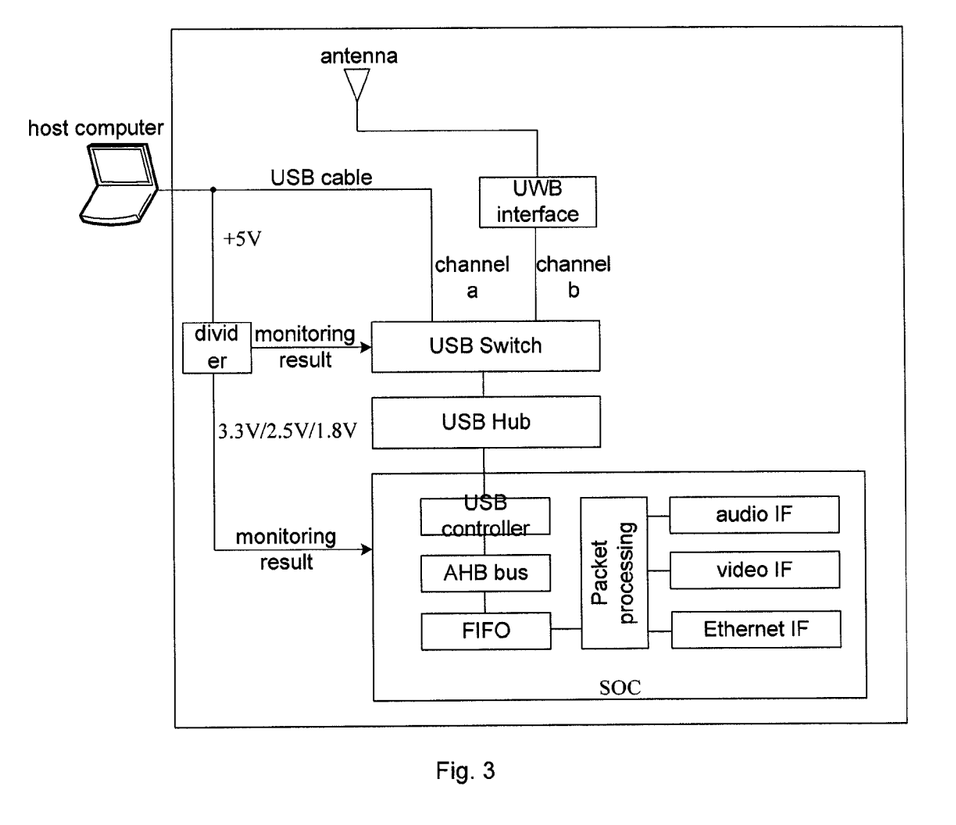
FIG. 3 is a schematic diagram showing a circuit implementation of a computer docking station according to an embodiment of the present invention.

Referring to FIG. 3, it shows, in a dotted line block, a schematic circuit diagram for implementation of the computer docking station shown in FIG. 2. As shown in FIG. 3, the computer docking station is connected to the host computer through a USB cable (in a wired way) and through an antenna and a UWB interface module (in a wireless way) respectively. A voltage divider circuit and a USB SWITCH shown in FIG. 3 correspond to the monitoring module 25 and the first switching module 26 respectively. Herein, an input of the voltage divider circuit is directly connected to a power signal (with a voltage of 5V) of the USB cable. When the USB cable is connected to the host computer in operation, the voltage divider circuit may output a monitoring result of a high level, and in particular, the high level may be +5V, +3.3V, +2.5V or +1.8V etc. based on level requirements of the USB SWITCH and a main chip SOC. When the USB SWITCH receives a monitoring result of the high level, the USB SWITCH switches to channel a of the wired USB connected to the host computer; on the contrary, if the USB cable is not connected to the host computer in operation, the USB SWITCH will receive a monitoring result of a low level, and thus the USB SWITCH switches to channel b of the UWB interface module connected to the host computer. Here, the voltage divider circuit and the USB SWITCH constitute a first stage switching circuit, wherein switching means switching between the physical channels, which belongs to hard switch.

In FIG. 3, when the docking station is connected to the host computer by the USB cable, various modules and units of the docking station may be powered by the voltage divider circuit.

In FIG. 3, the USB SWITCH is connected to a USB HUB. The USB HUB transmits USB data packets from the USB SWITCH to the main chip SOC and a serial/parallel interface unit. Here, the serial/parallel interface unit is provided to perform serial/parallel conversion on the data, and to transmit the converted data conforming to relevant format requirements to a peripheral serial port/parallel port device. In the SOC chip, the USB data packets are subject to processes such as transmission control by an USB controller, and are transmitted to a data packet processing unit through a high performance bus (AHB) and a FIFO to undergo operations such as parsing and classifying there; and then, the data packets of various services are transmitted to corresponding interface units respectively, such as audio, video, Ethernet interface units, then are processed at these interface units according to corresponding protocol standards, and finally are transmitted to corresponding peripheral devices.

In an embodiment of the invention, the reliability of switching by the first stage switching circuit may further be tested. First, the host computer adds, in a data packet to be transmitted therefrom, a channel identification bit for identifying the data packet as a wireless data packet or a wired data packet. As shown in FIG. 3, the monitoring result outputted by the voltage divider circuit is further transmitted to the main chip SOC, in which a decision module and an alarm module are incorporated, wherein, the decision module is adapted to receive the data packet transmitted from the host computer, and to output a decision result which indicates whether the data packet is a wireless data packet or a wired data packet according to the channel identification bit in the data packet; and the alarm module is adapted to receive the monitoring result and the decision result, and to output an indication signal indicating that the first switching module is in normal operation when the monitoring result indicates that the wired input/output module is connected to the host computer and the decision result indicates a wired data packet or when the monitoring result indicates that the wired input/output module is not connected to the host computer and the decision result indicates a wireless data packet, or alternatively output an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

Thus, in this way, the computer docking station may check whether the current received data packet matches the current operation channel, to determine whether the first stage switching is normal. When the switching is abnormal, the user may get an alarm and know clearly where is the fault (e.g. the fault occurs at the first stage switching), so that he can take corresponding measurements against this. As a result, the reliability of the first stage switching is improved.

In addition to the above first stage switching, there may also be a second stage switching based on priorities of the data packets according to an embodiment of the invention. Specifically, in the first data processing module 24 shown in FIG. 2, a second switching module is added, for first processing a data packet exchanged between the host computer and the peripheral devices with a higher priority according to priority information of the data packet. Here, the priority information is determined based on a priority identification carried in the data packet or predetermined based on the service type of the data packet. That is, the host computer or the peripheral devices may carry, in a data packet to be transmitted therefrom, a priority identification to identify the priority of the data packet. As a result, upon receiving a plurality of data packets, the second switching module may first process the data packet whose priority is higher according to the processing capacity of itself and the priorities of the data packets. Of course, the priorities of various types of data packets may be preset in the second switching module, so that the second switching module may perform corresponding processes directly based on the types of the data packets. Such processing manner is advantageous in implementing flexible channel selection according to particular requirements.

In the above embodiments, (1) if it is the case where there are only USB wired data inputted, which USB data may be referred to as composite data, mainly including data for audio, video, Ethernet, and other interfaces, the composite data are processed by the first data processing module 24; (2) if it is the case where there are only UWB wireless data inputted, the data are inputted by the wireless input/output module 22, including data for audio, video, Ethernet, and other interfaces, and again the composite data are processed by the first data processing module 24; and (3) if it is the case where there are both USB wired data and UWB wireless data inputted, the priority of the USB wired transmission is higher than that of the UWB wireless transmission, i.e. the default option is to support the USB wired data input when there are both the USB data and the UWB data. By doing so, an advantageous consists in that: by means of the channel selection performed at the first stage switching, it is possible to avoid the necessity that the subsequent is data processes must support several USB controllers, and meanwhile it is possible to avoid the ping-pong effect due to unstable UWB data transmission, in which effect frequent switches between the USB and the UWB occur.

Figure 4:
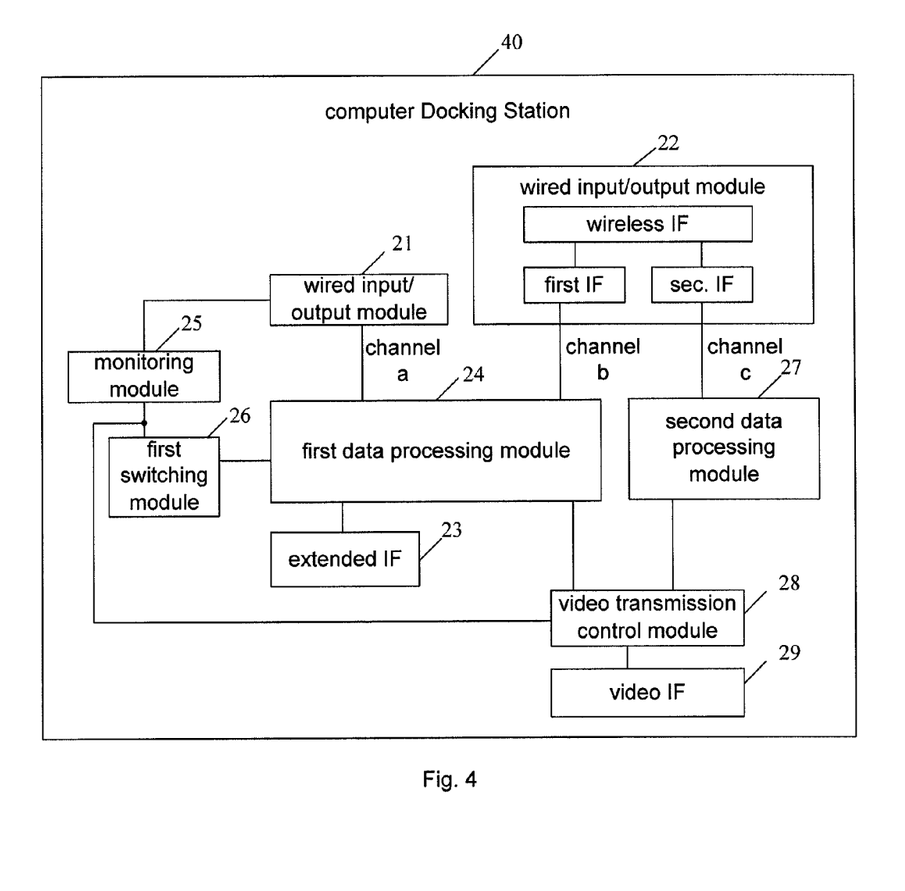
FIG. 4 is a structure schematic diagram showing a computer docking station according to a further embodiment of the present invention.

FIG. 4 is a structure schematic diagram showing a computer docking station according to a further embodiment of the present invention. Some of modules or units of the computer docking station 40 are same as those of the computer docking station 20 shown in FIG. 2, and the difference between these two embodiments consists in that: the computer docking station further comprises a second data processing module 27 and a video transmission control module 28, and there is an extended interface unit being a video interface unit 29 connectable to a peripheral video device. Specifically, a wireless input/output module 22 shown in FIG. 4 comprises a wire interface, a first interface, and a second interface, wherein the wireless interface is connectable to the host computer, the first interface is connectable to the first data processing module, and the second interface is connectable to the second data processing module. The wireless interface is adapted to receive wireless data packets from the host computer, to transmit video data packets included in the wireless data packets to the second data processing module 27 through the second interface (channel c), and to transmit other data packets included in the wireless data packets than the video data packets to the first data processing module 24 through the first interface (channel b). The second data processing module 27 is connectable to the video interface unit to process the video data packets exchanged between the host computer and the video device.

The video transmission control module 28 is adapted to receive the monitoring result outputted from the monitoring module 25, and to control the video interface unit 29 to be connected to the first data processing module 24 when the monitoring result indicates that the wired input/output module 21 is connected to the host computer, or alternatively control the video interface unit 29 to be connected to the second data processing module 27 when the monitoring result indicates that the wired input/output module 21 is not connected to the host computer.

It can be seen that in the embodiment shown in FIG. 4, if it is the case where there are only UWB wireless data inputted, both channel b and channel c are selected, wherein channel b may be a low speed channel (for transmitting data packets including audio and Ethernet packets), and channel c may be a high speed channel (for transmitting video data packets). After entering the main chip SOC by means of the first stage switching, the data packets on channel b will not undergo the second stage switching, but are subject to parsing and outputting (to the corresponding extended interface units) directly under control of a dedicated chip (e.g. ARM chip). The data packets on channel c may directly enter the second data processing module 27, and are processed by the second processing module 27 before being outputted to the video interface unit 29. By dedicating channel c to the video channel transmission, it is possible to flexibly select a more simple protocol, instead of the Wireless USB protocol with limited transmission efficiency and bandwidth, to generate video data packets. In this way, the total bandwidth for the wireless data transmission between the host computer and the computer docking station can be increased greatly to meet the user's requirements. For example, either the host computer or the wireless input/output module 22 may perform the transmission control process on the data for the video service according to Wimedia MAC based video service data transfer protocol customized by users, IP protocol based Winet protocol, or next generation based Ultra wideband transfer protocol, to generate the video data packets.

It is to be noted that in the computer docking station 40 shown in FIG. 4, instead the wireless input/output module 22 may just be connected to the second data processing module 27 only though channel c. Such mode is designed just for higher speed wireless data transmission when UWB is well developed in the future.

Currently the common UWB technology adopts the Wireless USB protocol, and thus has limited bandwidth (generally, less than 100 Mbps). As a result, in transmitting a large amount of data (for example the video data), it can not meet the user requirements. The addition of the dedicated video channel in the embodiment can compensate for the insufficient bandwidth due to the Wireless USB adopted by the existing UWB, and also can adapt to the possibility that a new transmission interface may be adopted by the future UWB. Further, the docking station according to the embodiments of the present invention may be implemented by an embedded CPU, or alternatively may be implemented by a low cost FPGA or a dedicated ASIC.

As described above, the switching function is incorporated in the computer docking station according to the embodiments of the present invention such that the computer docking station is able to support providing an extended interface to the computer in a wireless way and a wired way. As a result, the computer docking station is convenient and flexible in use, has good mobility and expansibility, and thus can meet the user requirements.

Figure 5:
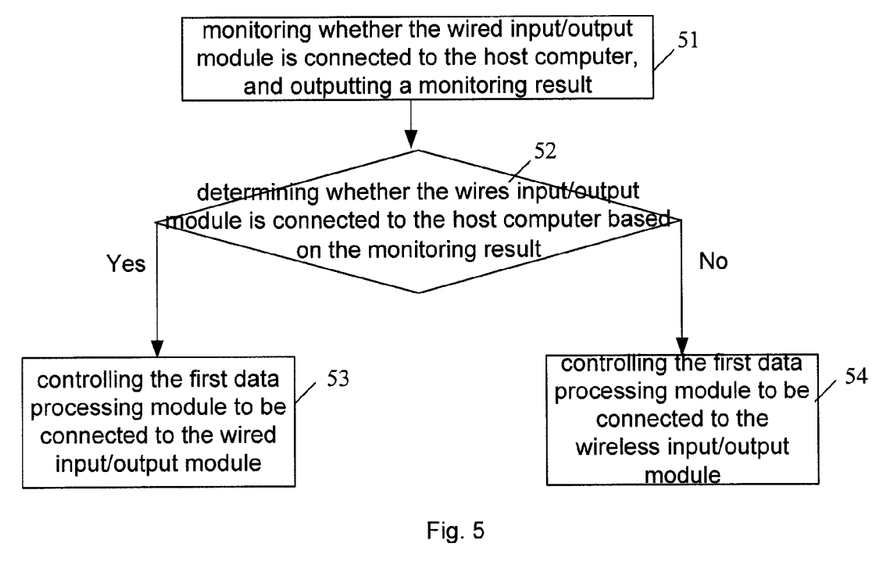
FIG. 5 is a flowchart showing a switching method of a computer docking station according to an embodiment of the present invention.

Based on the computer docking station described in the above embodiments, there is also provided a switching method of a computer docking station according to an embodiment of the invention. Here, the docking station comprises: a wireless input/output module and a wired input/output module connectable to a host computer; at least one extended interface unit to be connected to at least one peripheral device matching the extended interface unit; a first data processing module for processing data packets exchanged between the host computer and the peripheral device, wherein the first data processing module is connected to each of the at least one extended interface unit, and is connectable to either of the wireless input/output module and the wired input/output module. As shown FIG. 5, the switching operation of the computer docking station according to the embodiment comprises steps of:

step 51, monitoring whether the wired input/output module is connected to the host computer or not, and outputting a monitoring result;

step 52, determining, based on the monitoring result, whether the wired input/output module is connected to the host computer or not, wherein when the monitoring result indicates that the wired input/output module is connected to the host computer, it proceeds to step 53, or otherwise when the monitoring result indicates that the wired input/output module is not connected to the host computer, it proceeds to step 54;

step 53, controlling the first data processing module to be connected to the wired input/output module;

step 54, controlling the first data processing module to be connected to the wireless input/output module.

Preferably, the above switching method may further comprise: the first data processing module first processing a data packet whose priority is higher based on priority information of the data packet, wherein the priority information is determined based on a priority identification carried in the data packet or is predetermined based on the service type of the data packet.

Preferably, the above switching method may further comprise: receiving a data packet transmitted from the host computer, and outputting a decision result which indicates whether the data packet is a wireless data packet or a wired data packet according to a channel identification bit in the data packet, wherein the channel identification bit is one added by the host computer in the transmitted data packet for identifying the data packet as a wireless data packet or a wired data packet; receiving the monitoring result and the decision result, and outputting an indication signal indicating the first switching module is in normal operation when the monitoring result indicates that the wired input/output module is connected to the host computer and the decision result indicates a wired data packet or when the monitoring result indicates that the wired input/output module is not connected to the host computer and the decision result indicates a wireless data packet; or otherwise outputting an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

Here, the computer docking station may further comprise a second data processing module; the at least one extended interface unit comprises a video interface unit connectable to a peripheral video device; the wireless input/output module comprises a wireless interface, a first interface and a second interface, wherein the wireless interface is connectable to the host computer, the first interface is connected to the first data processing module, and the second interface is connected to the second data processing module. In this case, the above switching method may further comprise:

controlling the video interface unit to be connected to the second data processing module, when the monitoring result indicates that the wired input/output module is not connected to the host computer; receiving wireless data packets from the host computer through the wireless interface; transmitting video data packets included in the wireless data packets to the second data processing module through the second interface, and transmitting other data packets included in the wireless data packets than the video data packets to the first data processing module through the first interface; and processing the video data packets exchanged between the host computer and the video device by the second data processing module.

Preferably, the video data packets described above are those produced by the host computer by performing the transmission control process on the data for the video service according to the video service data transfer protocol. Specifically, the video service data transfer protocol may comprise Wimedia MAC based video service data transfer protocol customized by users, IP protocol based Winet protocol, and next generation based Ultra wideband transfer protocol.

Preferably, the monitoring result described above may be produced by: connecting a voltage divider circuit to a power pin of the wired input/output module, and outputting a monitoring result of high level when the USB interface module is connected to the host computer, or otherwise outputting a monitoring result of low level when the USB interface module is not connected to the host computer, wherein the high level signal is provided to indicate that the wired input/output module is connected to the host computer, while the low level signal is provided to indicate that the wired input/output module is not connected to the host computer.

In the above method, the computer docking station is provided with the wireless input/output module and the wired input/output module, and is able to automatically connect to one of the input/output modules according to the monitoring result. As a result, it is possible to support wired/wireless docking in a flexible and convenient manner.

It should be noted that those described above are just preferred embodiments of the invention. It will be understood by those skilled in the art that various changes and improvements may be made without departing from the principle of the present invention, and these changes and improvements fall into the scope of the present invention.

What is claimed is:

1. A computer docking station, comprising:
 a wireless input/output module adapted to receive data from a host computer in a wireless way and/or transmit data to the host computer in a wireless way;
 a wired input/output module adapted to receive data from the host computer in a wired way and/or transmit data to the host computer in a wired way;
 at least one extended interface unit adapted to be connected to at least one peripheral device;
 a first data processing module which is connected to each of the at least one extended interface unit for processing data packets exchanged between the host computer and the peripheral device;
 a monitoring module adapted to monitor whether the wired input/output module is connected to the host computer and/or monitor whether a wireless connection is established between the wireless input/output module and the host computer, and to output a monitoring result; and
 a first switching module adapted to control the first data processing module to be connected to the wired input/ output module when the monitoring result indicates that the wired input/output module is connected to the host computer, and to control the first data processing module to be connected to the wireless input/output module when the monitoring result indicates that the wired input/output module is not connected to the host computer; and
 wherein the first data processing module further comprises:
 a decision module adapted to receive a data packet transmitted by the host computer, and to output a decision result indicating whether the data packet is a wireless data packet or a wired data packet according to a channel identification bit included in the data packet, wherein the channel identification bit is one added in the transmitted data packet by the host computer for identifying the data packet as a wireless data packet or a wired data packet.

2. The computer docking station of claim 1, wherein, the first data processing module comprises:
 a second switching module adapted to first process a data packet with a higher priority according to priority information of the data packet, wherein the priority information is predetermined based on a priority identification carried in the data packet or based on the service type of the data packet.

3. The computer docking station of claim 1, wherein, the first data processing module further comprises:
 an alarm module adapted to receive the monitoring result and the decision result, and to output an indication signal indicating the first switching module is in normal operation when the monitoring result indicates that the wired input/output module is connected to the host computer and the decision result indicates a wired data packet or when the monitoring result indicates that the wired input/output module is not connected to the host computer and the decision result indicates a wireless data packet, or otherwise to output an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

4. The computer docking station of claim 1, wherein, the computer docking station further comprises a second data processing module and a video transmission control module; the at least one extended interface unit includes a video interface unit, which is connectable to a peripheral video device;
 the wireless input/output module comprises a wireless interface, a first interface and a second interface, wherein the first interface is connected to the first data processing module, the second interface is connected to the second data processing module, and the wireless interface is adapted to receive wireless data packets from the host computer, then to transmit video data packets included in the wireless data packets to the second data processing module through the second interface, and to transmit other data packets included in the wireless data packets than the video data packets to the first data processing module through the first interface;
 the second data processing module is connectable to the video interface unit, and is adapted to process the video data packets exchanged between the host computer and the video device; and the video transmission control module is adapted to receive the monitoring result, and to control the video interface unit to be connected to the first data processing module when the monitoring result indicates that the wired input/output module is connected to the host computer, or otherwise control the video interface unit to be connected to the second data processing module when the monitoring result indicates that wired input/output module is not connected to the host computer.

5. The computer docking station of claim 4, wherein, the video data packets are those generated by the host computer by performing transmission control process on data for the video service according to a video service data transfer protocol, and the video service data transfer protocol comprises Wimedia MAC based video service data transfer protocol customized by a user, IP protocol based Winet protocol, or next generation based Ultra wideband transfer protocol.

6. The computer docking station of claim 1, wherein, the wired input/output module comprises a USB interface module, and the monitoring module comprises a voltage divider circuit which is connected to a power pin of the USB interface module for outputting a high level signal when the USB interface module is connected to the host computer, and for outputting a low level signal when the USB interface module is not connected to the host computer, wherein the high level signal is provided to indicate that the wired input/output module is connected to the host computer, and the low level signal is provided to indicate that the wired input/output module is not connected to the host computer.

7. A switching method of a computer docking station, comprising:

monitoring whether a wired input/output module of the computer docking station is connected to a host computer and/or monitoring whether a wireless connection is established between a wireless input module of the computer docking station and the host computer, and outputting a monitoring result, wherein the computer docking station is operable to receive data from the host computer in a wireless way and/or transmit data to the host computer in a wireless way through the wireless input/output module, and also is operable to receive data from the host computer in a wired way and/or transmit data to the host computer in a wired way through the wired input/output module;

controlling a first data processing module to be connected to the wired input/output module when the monitoring result indicates that the wired input/output module is connected to the host computer, or otherwise controlling the first data processing module to be connected to the wireless input/output module when the monitoring result indicates that the wired input/output module is not connected to the host computer, wherein the first data processing module is connected to at least one peripheral device through at least one extended interface unit for processing data packets exchanged between the host computer and the peripheral device;

receiving a data packet transmitted by the host computer, and outputting a decision result which indicates whether the data packet is a wireless data packet or a wired data packet according to a channel identification bit included in the data packet, wherein the channel identification bit is one added in the transmitted data packet by the host computer for identifying the data packet as a wireless data packet or a wired data packet.

8. The switching method of claim 7, further comprising: the first data processing module first processing a data packet with a higher priority according to priority information of the data packet, wherein the priority information is determined based on a priority identification carried in the data packet or is predetermined based on the service type of the data packet.

9. The switching method of claim 1, further comprising:

receiving the monitoring result and the decision result, and outputting an indication signal indicating the first switching module is in normal operation when the monitoring result indicates that the wired input/output module is connected to the host computer and the decision result indicates a wired data packet or when the monitoring result indicates that the wired input/output module is not connected to the host computer and the decision result indicates the wireless data packet, or otherwise outputting an indication signal indicating that the first switching module is in abnormal operation when the monitoring result indicates that the wired input/output module is connected to the host computer while the decision result indicates a wireless data packet or when the monitoring result indicates that the wired input/output module is not connected to the host computer while the decision result indicates a wired data packet.

10. The switching method of claim 7, further comprising:

controlling a video interface unit to be connected to a second data processing module when the monitoring result indicates the wired input/output module is not connected to the host computer;

receiving wireless data packets from the host computer through a wireless interface, transmitting video data packets included in the wireless data packets to the second data processing module through a second interface, and transmitting other data packets included in the wireless data packets than the video data packets to the first data processing module through a first interface; and processing, by the second data processing module, the video data packets exchanged between the host computer and a video device.

11. The switching method of claim 10, wherein, the video data packets are those generated by the host computer by performing transmission control process on data for the video service according to a video service data transfer protocol, and the video service data transfer protocol comprises Wimedia MAC based video service data transfer protocol customized by a user, IP protocol based Winet protocol, or next generation based Ultra wideband transfer protocol.

12. The switching method of claim 7, wherein, the monitoring result is generated by: connecting a voltage divider circuit to a power pin of the wired input/output module, which voltage divider circuit outputs a high level signal when the wired input/output module is connected to the host computer, and outputs a low level signal when the wired input/output module is not connected to the host computer, wherein the high level signal is provided to indicate that the wired input/output module is connected to the host computer, and the low level signal is provided to indicate that the wired input/output module is not connected to the host computer.

* * * * *